US 12,448,988 B2

(12) United States Patent
Bensaih et al.

(10) Patent No.: US 12,448,988 B2
(45) Date of Patent: *Oct. 21, 2025

(54) MOTOR MOUNT AND FAN FOR MIXING AIR IN A HEATING, VENTILATION AND/OR AIR-CONDITIONING DEVICE OF A MOTOR VEHICLE

(71) Applicant: Valeo Systemes Thermiques, Le Mesnil-Saint-Denis (FR)

(72) Inventors: Elmehdi Bensaih, Le Mesnil-Saint-Denis (FR); Frédéric Moulinas, Le Mesnil-Saint-Denis (FR); Stéphane De Souza, Le Mesnil-Saint-Denis (FR); Guillaume Robelet, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 25 days.

This patent is subject to a terminal disclaimer.

(21) Appl. No.: 18/009,489

(22) PCT Filed: Jun. 3, 2021

(86) PCT No.: PCT/EP2021/064911
§ 371 (c)(1),
(2) Date: Dec. 9, 2022

(87) PCT Pub. No.: WO2021/249862
PCT Pub. Date: Dec. 16, 2021

(65) Prior Publication Data
US 2023/0287901 A1 Sep. 14, 2023

(30) Foreign Application Priority Data
Jun. 10, 2020 (FR) ........................................ 2006088

(51) Int. Cl.
*F04D 29/66* (2006.01)
*F16F 1/373* (2006.01)
(Continued)

(52) U.S. Cl.
CPC ............ F04D 29/668 (2013.01); F16F 1/373 (2013.01); F16F 1/38 (2013.01); F16F 15/08 (2013.01); H02K 5/24 (2013.01); *F04D 25/08* (2013.01)

(58) Field of Classification Search
CPC ........ F04D 29/668; F04D 25/08; F16F 15/12; F16F 1/373; F16F 1/38; F16F 15/08; H02K 5/24
(Continued)

(56) References Cited

U.S. PATENT DOCUMENTS 3,323,763 A * 6/1967 Butts ........................ F16F 1/387
248/606
4,171,190 A * 10/1979 Hudson ..................... H02K 5/24
74/606 R
(Continued)

FOREIGN PATENT DOCUMENTS

DE 4136485 A1 * 5/1993 ............. F04D 25/06
DE 4306588 A1 * 1/1994 ............. F04D 29/668
(Continued)

OTHER PUBLICATIONS

Machine Translation of FR 3047125 (Year: 2017).*
(Continued)

*Primary Examiner* — Taylor Morris
(74) *Attorney, Agent, or Firm* — Osha Bergman Watanabe & Burton LLP

(57) ABSTRACT

A motor mount (18), in particular for a motor-fan unit of fan (10) for a vehicle heating, ventilation and/or air-conditioning device, comprising two coaxial rings (22; 24), namely an
(Continued)

inner ring (22) able to receive one or more elements of the motor (14) and an outer ring (24) able to be fixed to a housing that forms a structural element, first decoupling means (28) for limiting the relative movement of the two rings (22; 24) in a plane (P) normal to the common axis (A) of the two rings (22; 24), and second decoupling means (38) for limiting the relative movement of the two rings (22; 24) in the direction of the common axis (A) of the two rings (22; 24).

11 Claims, 5 Drawing Sheets

(51) Int. Cl.
| | | |
|---|---|---|
| *F16F 1/38* | (2006.01) | |
| *F16F 15/08* | (2006.01) | |
| *H02K 5/24* | (2006.01) | |
| *F04D 25/08* | (2006.01) | |

(58) Field of Classification Search
USPC .......................................................... 248/638
See application file for complete search history.

(56) References Cited

U.S. PATENT DOCUMENTS

| | | | | |
|---|---|---|---|---|
| 5,133,617 | A * | 7/1992 | Sokn | ................. H02K 5/24 |
| | | | | 403/348 |
| 6,672,730 | B1 * | 1/2004 | Hanft | ................. B60R 1/072 |
| | | | | 359/872 |
| 7,510,164 | B2 * | 3/2009 | Geroux | ............. B60H 1/00428 |
| | | | | 248/605 |
| 8,596,596 | B2 * | 12/2013 | Naji | ................. F04D 29/662 |
| | | | | 248/315 |
| 9,172,284 | B2 * | 10/2015 | Truillet | ................. F04D 29/668 |
| 9,631,636 | B2 * | 4/2017 | Le Goff | ................. F04D 25/082 |
| 10,227,994 | B2 * | 3/2019 | Wolf | ................. F04D 29/626 |
| 12,135,043 | B2 * | 11/2024 | Bensaih | ................. H02K 5/24 |
| 2014/0175926 | A1 * | 6/2014 | Truillet | ................. F04D 25/08 |
| | | | | 310/91 |
| 2016/0164369 | A1 * | 6/2016 | Wolf | ................. F04D 29/668 |
| | | | | 310/51 |
| 2017/0110932 | A1 * | 4/2017 | Berkouk | ................. F04D 25/08 |
| 2019/0074748 | A1 * | 3/2019 | Le Goff | ................. H02K 5/24 |
| 2020/0080617 | A1 * | 3/2020 | Thawani | ................. F16F 15/08 |
| 2020/0277965 | A1 * | 9/2020 | Yoshino | ................. F04D 29/325 |
| 2020/0378467 | A1 * | 12/2020 | Bach-Esteve Burch | ..................... H02K 5/22 |
| 2022/0282764 | A1 * | 9/2022 | Hosoda | ............... F16F 13/1481 |

FOREIGN PATENT DOCUMENTS

| | | | | |
|---|---|---|---|---|
| DE | 102014224900 A1 | | 6/2016 | |
| DE | 102015116350 A1 | | 3/2017 | |
| EP | 2456053 A1 * | | 5/2012 | ............... H02K 5/24 |
| FR | 2926411 A1 * | | 7/2009 | ............. F04D 25/08 |
| FR | 2983262 A1 * | | 5/2013 | ........... F04D 25/082 |
| FR | 3047125 A1 | | 7/2017 | |
| FR | 3139034 A1 * | | 3/2024 | |
| WO | WO-2012034687 A1 * | | 3/2012 | ......... F04D 25/0613 |
| WO | WO-2019063904 A1 * | | 4/2019 | ........... F04D 25/082 |
| WO | 2020/260822 A1 | | 12/2020 | |
| WO | WO-2020260794 A1 * | | 12/2020 | ............... B60H 1/00 |

OTHER PUBLICATIONS

International Search Report and Written Opinion issued in corresponding International Application No. PCT/EP2021/064911, mailed Jul. 8, 2021 (11 pages).

* cited by examiner

MOTOR MOUNT AND FAN FOR MIXING AIR IN A HEATING, VENTILATION AND/OR AIR-CONDITIONING DEVICE OF A MOTOR VEHICLE

TECHNICAL FIELD

The present invention relates to the field of heating, ventilation and/or air-conditioning devices for motor vehicles. The invention relates more particularly to an electric-motor mount for a fan. The invention also relates to a fan comprising such a motor mount and a heating, ventilation and/or air-conditioning device comprising such a fan.

PRIOR ART

Motor vehicles are commonly equipped with a heating, ventilation and/or air-conditioning device that makes it possible to create an air flow in the passenger compartment. Such a device also makes it possible to manage the temperature and distribution of the air flow created within the vehicle passenger compartment. Such a heating, ventilation and/or air-conditioning device has, inter alia, a fan comprising a fan impeller rotated by an electric motor. The electric motor is in particular an electronically switched electric motor controlled by a power supply module.

An electronically switched electric motor, or brushless direct current motor, has a rotor and stator assembly, each of these components bearing electromagnetic elements the interaction of which generates the movement of the rotor in relation to the stator and, ultimately, the movement of the fan impeller.

The electric motor is assembled in the heating, ventilation and/or air-conditioning device via a motor mount comprising an inner ring configured to accept the stator of the electric motor, and an outer ring able to be fixed, directly or indirectly, to a structural element of the vehicle.

A decoupling element is interposed between the inner ring and the outer ring. This decoupling element is intended to limit, or even to prevent, the transmission of vibration and/or stress generated by the rotation of the electric motor, from the inner ring to the outer ring. This then limits the transmission to the heating, ventilation and/or air-conditioning device of vibrations that could be felt by the occupants of the vehicle.

The decoupling element generally allows relative movement of the inner ring in relation to the outer ring in a plane normal to an axis common to the two rings. The vibrations propagating in this plane are thus filtered, and only a small residual portion thereof can propagate in the vehicle passenger compartment and have an adverse effect on the comfort of the occupants.

However, it has been observed that vibrations in the direction of the axis common to the rings could be transmitted by such a motor mount, in particular at low frequencies. These vibrations also cause noise in the passenger compartment, which can be annoying for the occupants, in particular in an electric motor vehicle.

The object of the present invention is to propose a motor mount, in particular for a fan of a motor vehicle heating, ventilation and/or air-conditioning device, that is simple to produce and that does not exhibit at least some of the drawbacks of the mounts of the prior art.

SUMMARY

To this end, the invention relates to a motor mount, in particular for a motor-fan unit of fan for a vehicle heating, ventilation and/or air-conditioning device, comprising:

two coaxial rings, namely an inner ring able to receive one or more elements of the motor and an outer ring able to be fixed to a housing that forms a structural element, first decoupling means for limiting the relative movement of the two rings in a plane normal to the common axis of the two rings, and second decoupling means for limiting the relative movement of the two rings in the direction of the common axis of the two rings.

The transmission of vibrations in two perpendicular directions is thus advantageously limited or even prevented. At the same time, the noise generated in the passenger compartment due to the transmission of these vibrations is reduced.

Preferably, the motor mount comprises one or more of the following features, considered alone or in combination:

the first decoupling means comprise a plurality of first resilient pads, positioned radially between the inner ring and the outer ring and/or a resilient ring between the two rings, the resilient ring preferably being made from an elastomeric material, the resilient ring more preferably being overmolded on the two rings;

the first decoupling means comprise a plurality of first resilient pads and a resilient ring, the first pads being integrally formed with the resilient ring;

the second decoupling means comprise a plurality of second resilient pads positioned axially between the two rings;

each second resilient pad has an H-shaped cross-section such that each arm of the H is in contact with a respective ring;

each second pad is in the shape of two half-cylinders joined by their cylindrical surfaces, the planar surface of each half-cylinder being in contact with a respective ring, the two half-cylinders preferably extending along parallel axes, more preferably along axes perpendicular to the common axis of the two rings;

the motor mount comprises at least one element for limiting the tilting of the inner ring in relation to the outer ring, the tilt limiting element comprising at least one finger that extends protruding from a first of the two rings and is housed in a recess formed in the second of the two rings, each second pad extending between a finger of the first ring and a wall of the associated recess in the second ring, normal to the common axis of the rings;

a second pad extends between each of the fingers of the first ring and the walls of the associated recess in the second ring, normal to the common axis of the rings;

each second pad is axially compressed, the compression ratio of each second pad preferably being greater than or equal to 5% and less than or equal to 15%, more preferably substantially equal to 10%;

the first decoupling means comprise a resilient ring, and the second pads are integrally formed with the resilient ring;

at least one radial stop extends between the inner ring and the outer ring, the motor mount preferably comprising at least two radial stops opposite each other in relation to the center of the rings, more preferably at least three radial stops evenly angularly distributed about the common axis of the two rings;

the finger is between the two second pads in the direction of the common axis of the two rings;

the second pads associated with a single finger are identical, all of the second pads being more preferably identical;

the two opposite faces of each finger, facing the surfaces of the recess, normal to the axis of the rings, are planar;

the resilient ring of the first decoupling means is made from SEBS (styrene-ethylene-butylene-styrene) or silicone;

the resilient ring of the first decoupling means is made from an elastomeric material having a Shore hardness of between 25 and 50; and each finger has an H-shaped transverse cross-section.

Another aspect of the invention describes a fan, particularly for a vehicle heating, ventilation and/or air-conditioning device, comprising an electric motor, particularly a brushless electric motor, a fan impeller, rotated by the electric motor, and a motor mount as described above in all its combinations, the motor, particularly the stator of the motor, being fixed to the inner ring of the motor mount.

Yet another aspect of the invention describes a heating, ventilation and/or air-conditioning device for a motor vehicle, comprising a duct and a fan as described above in all its combinations, the fan impeller being in the duct.

BRIEF DESCRIPTION OF THE DRAWINGS

Further features, details and advantages will become more clearly apparent from reading the detailed description given below by way of illustration and with reference to the following figures.

DETAILED DESCRIPTION

Figure 1:
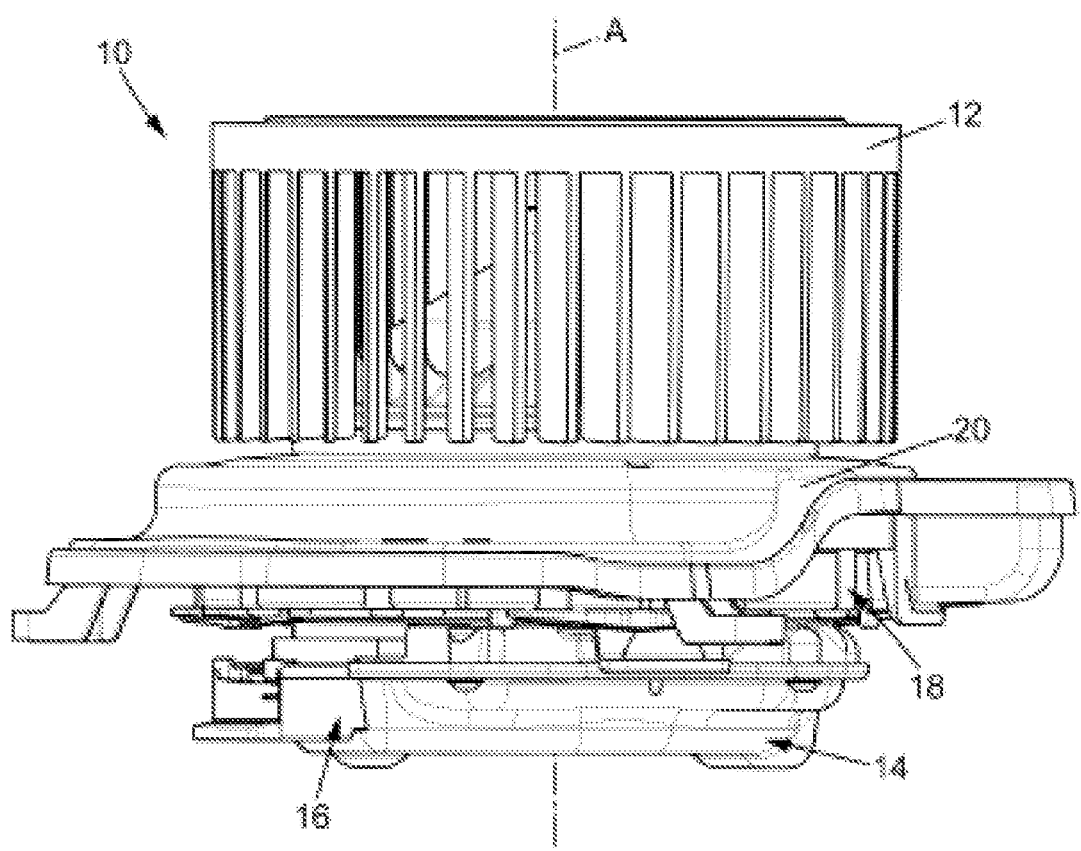
FIG. 1 is a schematic side view of one example of a fan for a motor vehicle heating, ventilation and/or air-conditioning device.
Figure 2:
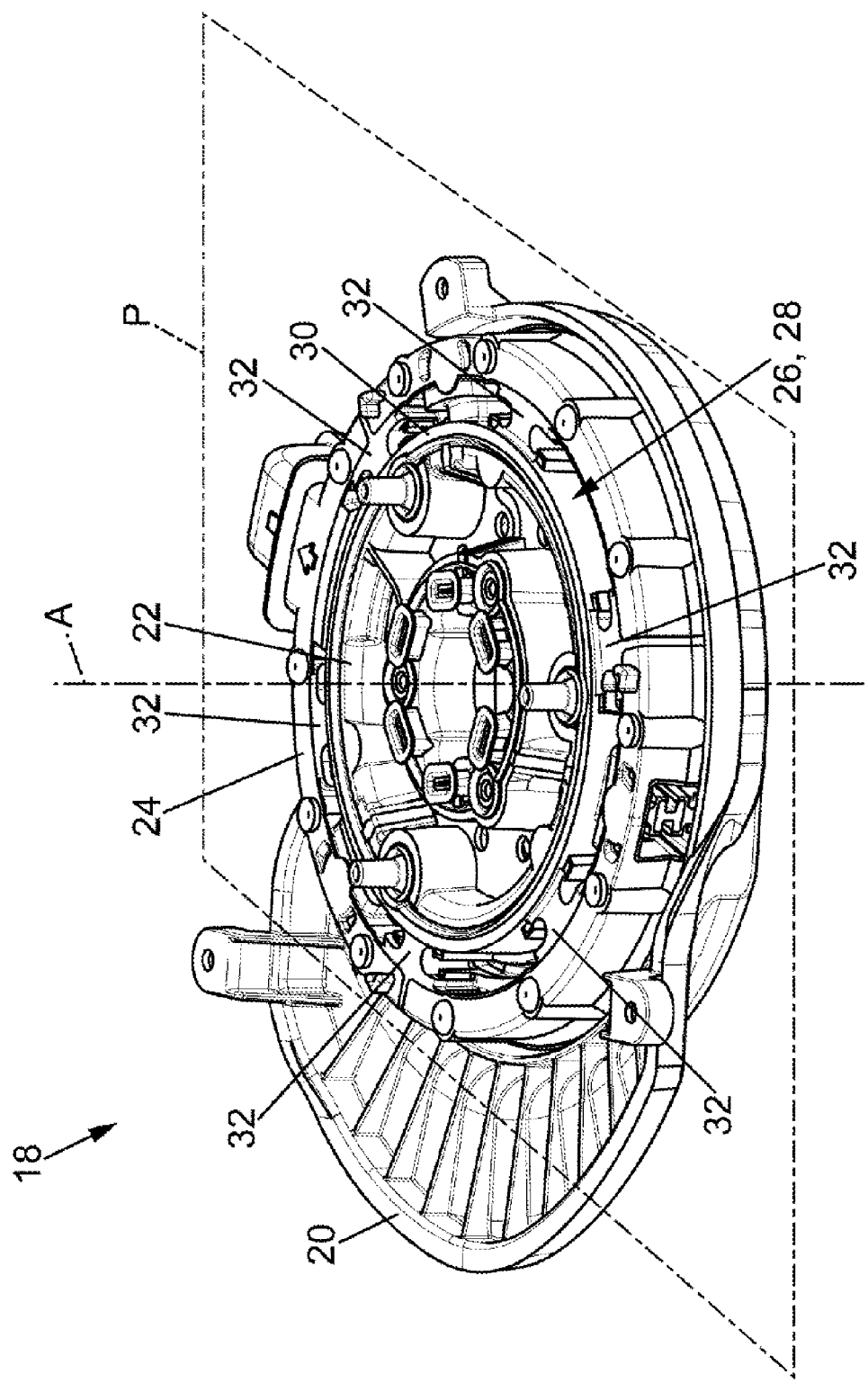
FIG. 2 is a schematic perspective view of a subassembly of the fan in FIG. 1, comprising a motor mount and a fan housing.
Figure 3:
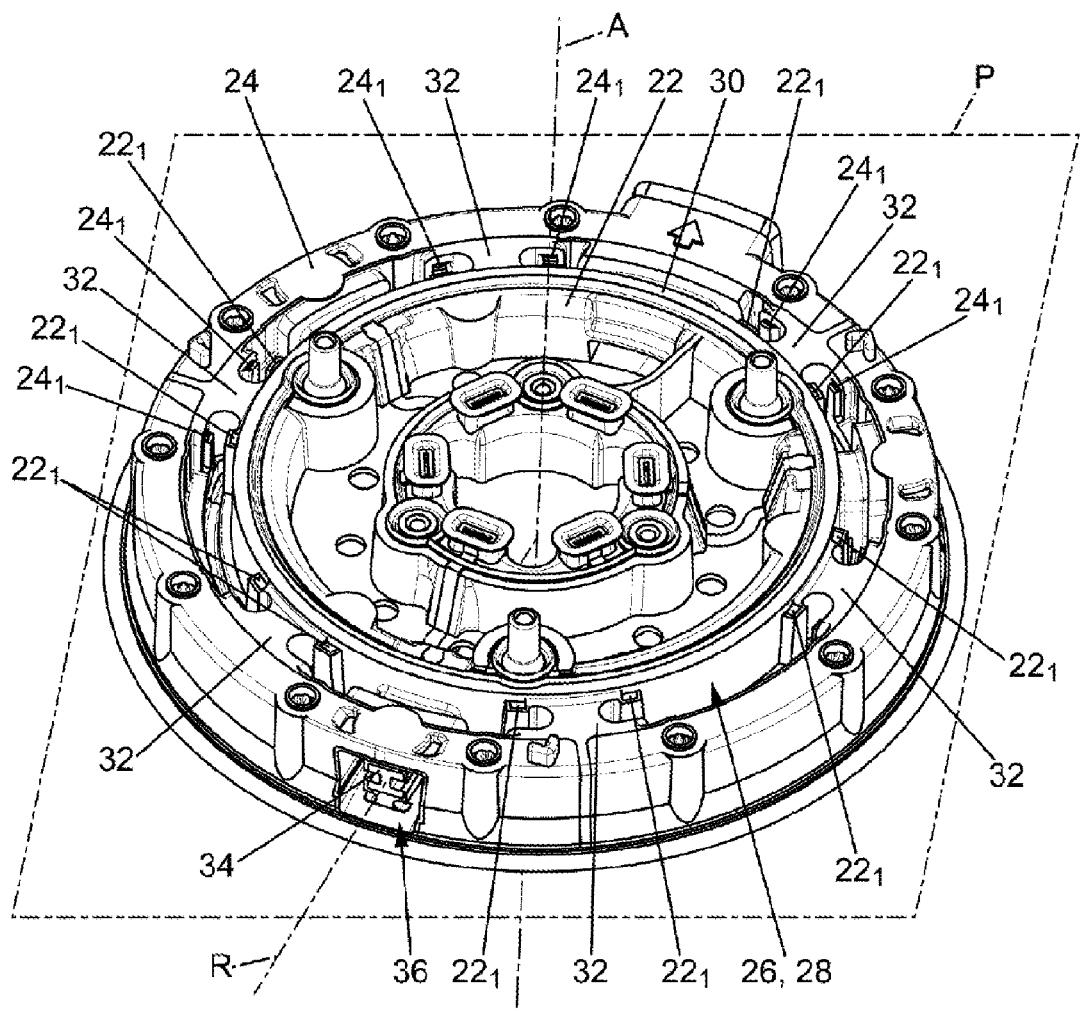
FIG. 3 is a schematic perspective view of a subassembly of the motor mount in FIG. 2.

FIG. 1 schematically illustrates a side view of a fan 10 for a motor vehicle heating, ventilation and/or air-conditioning device. Conventionally, such a motor vehicle heating, ventilation and/or air-conditioning device comprises a ventilation circuit, a fan 10 for moving the air in the ventilation circuit, and means for heating and/or means for cooling the flow of air set in motion by the fan device 10.

As illustrated in FIG. 1, the fan 10 essentially comprises a fan impeller 12 and an electric motor 14, here hidden by a motor cowl 16, for rotating the fan impeller 12 about its axis A. The electric motor 14 is for example a brushless motor. The fan 10 further comprises a motor mount 18 allowing the electric motor 14 to be assembled on a mount. In this particular instance, the electric motor 14 is connected to a deflector 20 of the motor mount 18, the deflector 20 forming part of the ventilation circuit of the heating, ventilation and/or air-conditioning device.

The motor mount 18 is described in greater detail below.

As visible in the figures, the motor mount 18 essentially comprises an inner ring 22, an outer ring 24 and a decoupling element 26 interposed between the inner ring 22 and the outer ring 24. The decoupling element 26 is intended to limit the transmission of vibrations from one of the two rings 22, 24 to the other of the two rings 22, 24.

Here, the decoupling element 26 forms first decoupling means 28, suitable for limiting the relative movement of the two rings 22, 24 in a common plane of extension P of the two rings 22, 24. Here, the common plane of extension P of the two rings 22, 24 is normal to the axis A of rotation of the fan impeller 12.

The first decoupling means 28 comprise, in the example illustrated, a resilient ring 30. Here, the resilient ring is made from an elastomeric material. By way of example, the elastomeric material is SEBS (styrene-ethylene-butylene-styrene). Alternatively, the resilient ring 30 can be made from silicone.

Here, the inner ring 24, outer ring 24 and resilient ring 30 are coaxial, having, as common axis, the axis of rotation A of the fan impeller 12. Hereinafter, the axis A will continue to be referred to as the axis A of rotation of the fan impeller. However, it must be noted that this axis A in fact corresponds to the common axis of the inner ring 22, the outer ring 24 and the resilient ring 30.

The resilient ring 30 is for example overmolded on the inner ring 22 and outer ring 24. The resilient ring 30 thus joins together the inner ring 22 and outer ring 24. Here, the resilient ring 30 in particular covers the radially inner surface of the outer ring 24, oriented toward the inner ring 22, and the radially outer surface of the inner ring 22, oriented toward the outer ring 24.

The first decoupling means 28 also comprise, in the example illustrated, a plurality of first resilient pads 32. Here, the resilient pads 32 are interposed between the inner ring 22 and the outer ring 24. Here, each first pad 32 has an H-shaped cross-section, the lateral arms of which are oriented in an orthoradial direction in relation to the axis A of rotation of the fan impeller 12, and the bar of which is oriented in a radial direction in relation to the axis A of rotation of the fan impeller 12. Advantageously, each first pad 32 is flush with the inner ring 22 and/or the outer ring 24, in the direction of the axis A of rotation of the fan impeller 12. This prevents sharp edges in the decoupling element 26, which are capable of creating incipient breaks in the decoupling element 26.

Each first pad 32 has for example a thickness, measured in the direction of the axis A of rotation of the fan impeller 12, greater than or equal to 10 mm, preferably greater than or equal to 14 mm, and/or less than or equal to 20 mm, preferably less than or equal to 16 mm.

In the example illustrated, the first decoupling means 28 comprise six first resilient pads 32, associated in pairs of adjacent first pads 32. The three pairs of adjacent first pads 32 are evenly angularly distributed about the axis A of rotation of the fan impeller 12.

The first pads 32 are for example made from an elastomeric material. By way of example, the elastomeric material is SEBS (styrene-ethylene-butylene-styrene). Alternatively, the resilient pads 32 can be made from silicone.

In the example illustrated, the first pads 32 are integrally formed with the resilient ring 30.

In addition, in order to further limit the relative movements of the inner ring 22 and the outer ring 24 in a radial direction in relation to the axis A of rotation of the fan impeller 12, the inner ring 22 has on its radially outer surface at last one protuberance $22_1$, protruding toward the outer ring 24, forming a radial stop. Likewise, the outer ring 24 has on its radially inner surface at least one protuberance $24_1$, protruding toward the inner ring 24, forming a radial stop. Here, advantageously, the protuberances $22_1$, $24_1$ of the inner and outer rings 22, 24 are aligned in pairs in a radial direction. This makes it possible to limit the range of movement of the inner and outer rings 22, 24. Here, advantageously, the protuberances $22_1$, $24_1$ are formed at the ends of the lateral arms of the first resilient pads 32. The protuberances $22_1$, $24_1$ thus also facilitate the overmolding of the first pads 32 on the inner and outer rings 22, 24. As a result, each ring 22, 24 comprises six protuberances $22_1$, $24_1$ in the example illustrated. Here, the six protuberances $22_1$, $24_1$ of each ring 22, 24 are associated in pairs of adjacent protuberances $22_1$, $24_1$, the three pairs of adjacent protuberances $22_1$, $24_1$ being evenly angularly distributed about the axis A of rotation of the fan impeller 12. Here, the protuberances $22_1$, $24_1$ are covered by the material forming the resilient ring 30.

The assembly formed by the inner ring 20, outer ring 22 and decoupling element 26 is received in a cavity of the deflector 20. The inner ring 22 is rigidly connected to the stator (not visible here) of the motor 14. Here, the outer ring 24 is fixed to the deflector 20. A layer of elastomeric material can be interposed between the outer ring 24 and the deflector 20.

In addition, according to the example depicted in the figures, the inner ring 22 has a plurality of fingers 34. The fingers 34 extend radially outward, from the outer surface of the inner ring 22. In this particular instance, each finger 34 has an H-shaped cross-section, comprising two substantially planar arms $34_1$, $34_2$ connected to each other by a bar $34_3$. Here, the arms $34_1$, $34_2$ are perpendicular to the direction of the axis A of rotation of the fan impeller 12. The thickness of each arm $34_1$, $34_2$ and of the bar $34_3$ can be between 1 mm and 3 mm. The thickness of each arm $34_1$, $34_2$ and of the bar $34_3$ can in particular be 2 mm.

In the example illustrated, the inner ring 22 has three fingers 34. The fingers 34 are preferably evenly angularly distributed about the axis A of rotation of the fan impeller 12. In particular, each finger 34 can extend in a radial direction R in relation to the axis A of rotation of the fan impeller 12 so that the plane formed by this radial direction R and containing the axis A of rotation of the fan impeller 12 is a plane of symmetry of two resilient pads 32 of a pair of adjacent resilient pads 32. In other words, two first adjacent pads 32 are positioned angularly symmetrically on either side of an associated finger 34.

The outer ring 24 for its part comprises a plurality of recesses 36. Each recess 36 is capable of receiving a respective finger 34. The recesses 36 thus open at least onto the radially inner surface of the outer ring 24. In this particular instance, the recesses 36 pass all the way through, opening onto the radially inner surface of the outer ring 24 and onto the radially outer surface of the outer ring 24. The recesses 36 are preferably evenly angularly distributed about the axis A of rotation of the fan impeller 12.

The fingers 34 being received in the recesses 36 makes it possible to limit the relative tilting of the inner ring 22 in relation to the outer ring 24. Tilting is given to mean any movement of one of the rings 22, 24 in relation to the other ring 22, 24 outside of the common midplane P of the rings 22, 24, normal to the direction of the axis A of rotation of the fan impeller 12.

In the example illustrated, the recesses 36 have dimensions such that there is clearance between the walls of each recess 36 and the finger 34 received therein. In particular, there is clearance in the orthoradial direction, theoretically allowing relative rotation of the inner ring 22 and the outer ring 24, about the axis A of rotation of the fan impeller 12.

The walls of each recess 36 can be covered with elastomeric material. Preferably, the layer of elastomer 37 that covers the walls of each recess 28, in particular the side walls $36_1$, is integrally formed with the resilient ring 30.

In addition, the motor mount 18 also comprises second decoupling means 38, in order to limit the relative movement of the two rings 22, 24 in the direction of the axis A of rotation of the fan 12.

Here, the second decoupling means 38 comprise a plurality of second resilient pads 40 positioned axially between the inner ring 22 and the outer ring 24. Here, "axially" is given to mean that each second resilient pad 40 extends at least partially, preferably fully, between part of the inner ring 22 and part of the outer ring 24, in the direction of the axis A of rotation of the fan impeller 12.

In the example illustrated, the second pads 40 are each positioned between a finger 34 and a wall $36_2$, $36_3$ of the recess 36 in which the finger 34 is received. In particular, each second pad 40 is positioned between a planar surface of an arm $34_1$, $34_2$ of a respective finger 34 and a wall $36_2$, $36_3$ of the recess 36, normal to the axis A of rotation of the fan impeller 12. Each finger 34 thus extends at least partially between a planar surface of an arm $34_1$, $34_2$ of a finger 34 and a wall $36_2$, $36_3$ of the recess 36, normal to the axis A of rotation of the fan impeller 12, in the direction of the axis A of rotation of the fan impeller 12.

Advantageously, two second pads 40 are associated with each finger 34. In particular, two second pads 40 can be positioned on either side of a single finger 34, in the direction of the axis A of rotation of the fan impeller 12. In other words, in the direction of the axis A of rotation of the fan impeller 12, each finger 34 can be between two second pads 40. The two second pads 40 associated with a single finger 34 can be identical in order to ensure substantially symmetrical behavior of the motor mount 18, regardless of the direction of movement of one ring in relation to the other, in the direction of the axis A of rotation of the fan impeller 12.

According to the example illustrated, each second pad 40 in contact with, or even compressed between, a planar surface of an arm $34_1$, $34_2$ of the finger 34 and a surface $36_2$, $36_3$ of the recess 36 normal to the axis A of rotation of the fan impeller 12. The possible range of movement of the finger 34 in the recess 36 is thus limited in the direction of the axis A of rotation of the fan impeller 12. For example, each second pad 40 can have an axial compression ratio greater than or equal to 5% and/or less than or equal to 25%, preferably substantially equal to 15%. The axial compression ratio can be defined as being the ratio between:

the difference between the thickness of the second pad 40, measured in the direction of the axis A of rotation of the fan impeller 12, before it is put in place between the finger 34 and the wall $36_2$, $36_3$ of the recess 36, normal to the direction of the axis A of rotation of the fan impeller 12, and the thickness of the second pad 40, measured in the direction of the axis A of rotation of the fan impeller 12, after it is put in place between the finger 34 and the wall $36_2$, $36_3$ of the recess 36, normal to the direction of the axis A of rotation of the fan impeller 12; and the thickness of the second pad 40, measured in the direction of the axis A of rotation of the fan impeller 12, before it is put in place between the finger 34 and the wall $36_2$, $36_3$ of the recess 36, normal to the direction of the axis A of rotation of the fan impeller 12.

The second pads 40 can be made from an elastomeric material. The elastomeric material from which the second pads 40 are formed can be chosen according to its hardness.

This elastomeric material can in particular have a Shore hardness greater than or equal to 25 and/or less than or equal to 50.

The second pads 40 can be overmolded on the fingers 34 of the inner ring 22 and/or on the walls $36_2$, $36_3$ of the recesses 36 of the outer ring 24. In one embodiment that appears to be particularly advantageous, the second pads 40 are integrally formed with the resilient ring 30 and the first pads 32, if applicable. The assembly of the motor mount 18 is in particular facilitated as a result.

Figure 4:
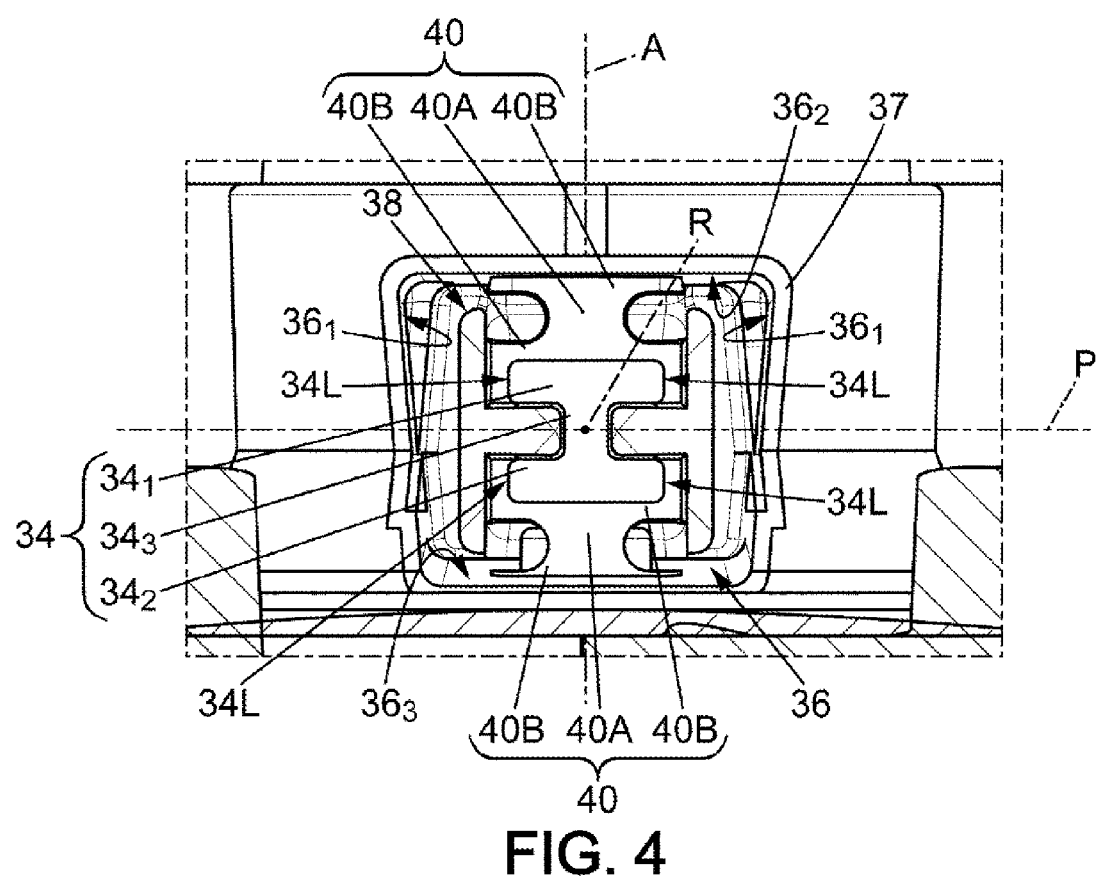
FIG. 4 is a schematic side view of a detail of the subassembly in FIG. 5.
Figure 5:
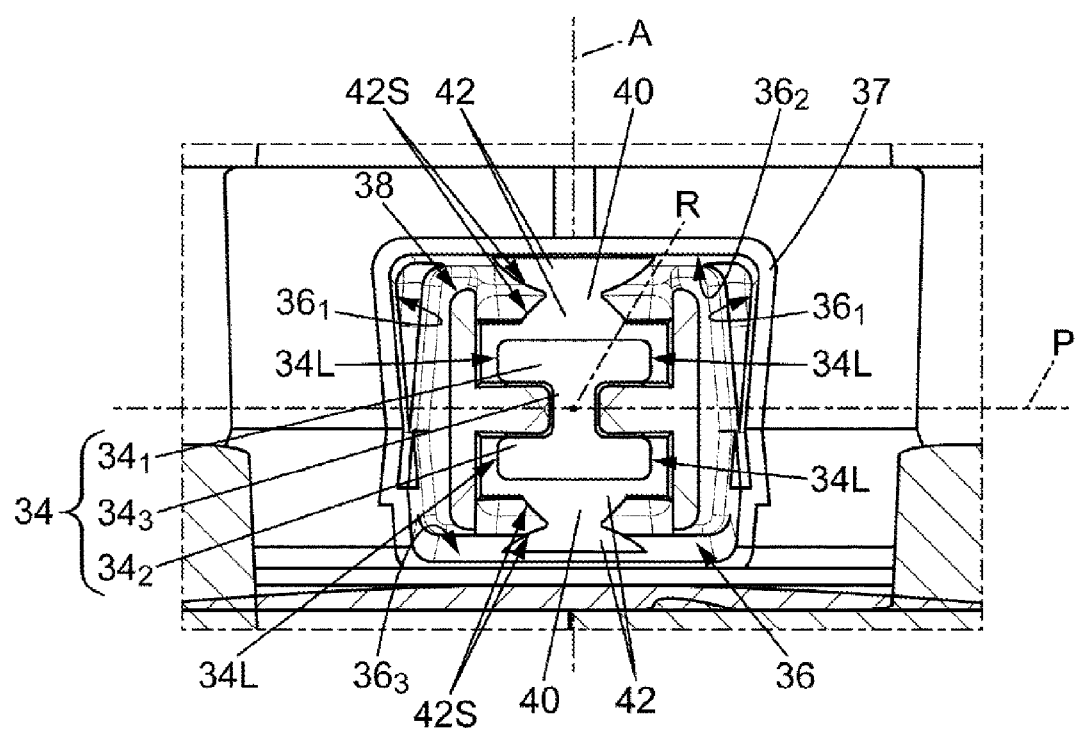
FIG. 5 is a schematic side view of a variant of the detail of the subassembly in FIG. 3.

FIGS. 4 and 5 illustrate two examples of possible shapes of the second pads 40.

According to the example in FIG. 4, each second pad 40 has a generally cylindrical shape, in that each second pad 40 has a constant transverse cross-section, each second pad 40 extending in a radial direction R in relation to the axis A of rotation of the fan impeller 12.

Here, the cross-section of each second pad 40 is H-shaped, so that each arm 40B of the H is in contact either with a planar surface of an arm $34_1$, $34_2$ of a finger 34 or with a wall $36_2$, $36_3$ of the recess 36, normal to the axis A of rotation of the fan impeller 12. Thus, each arm 40B of a second pad 40 is in contact with one of the two inner and outer rings 22, 24 respectively.

A bar 40A connects the two arms 40B of the cross-section of each second pad 40. Here, the bar 40A has a minimum thickness substantially equidistant from the two arms 40B, in the direction of the axis of rotation A of the fan impeller 12. The bar 40A has a flared shape from the part thereof corresponding to the minimum thickness toward each of the two arms 40B. The bar 40A thus allows a degree of flexibility of the second pad 40, which can thus be deformed.

It will be noted here that the lateral ends 34L of the arms $34_1$, $34_2$ of a finger 34 are also covered by the associated second pad 40. The second pad 40 is thus held in position on the associated finger 34.

According to the example in FIG. 5, each second pad 40 again has a generally cylindrical shape, in that each second pad 40 has a constant transverse cross-section, each second pad extending in a radial direction R in relation to the axis A of rotation of the fan impeller 12.

Here, each second pad 40 is substantially in the shape of two half-cylinders 42 joined by the cylindrical surfaces 42S thereof. Like the second pad 40, each half-cylinder 42 extends parallel to the radial direction R. The two half-cylinders 42 thus extend in particular along parallel axes. Here, the axes along which the two half-cylinders 42 extend are perpendicular to the axis A of rotation of the fan impeller 12.

The second pad 40 thus also has, in transverse cross-section, a minimum thickness substantially equidistant from the finger 34 and the wall $36_2$, $36_3$ of the recess 36. Again, this minimum thickness of the cross-section of the second pad 40 permits a degree of flexibility of the pad 40, which can thus be deformed.

It will be noted that in the example in FIG. 5 likewise, the lateral ends 34L of the arms of the finger 34 are also covered by the second pad 40. The second pad 40 is thus held in position on the associated finger 34.

The present disclosure is not limited to the examples described above but encompasses all variants and combinations conceivable to a person skilled in the art within the scope of the protection sought.

According to a first variant embodiment, the first decoupling means and the second decoupling means are independent. In particular, the first and second decoupling means can be formed by separate parts. However, the embodiment described above, in which the two decoupling means form a single part, appears advantageous in particular in that it facilitates the assembly of the motor mount. Making the decoupling means in a plurality of parts does however make it possible to use different materials for each of the decoupling means. It can in particular make it possible to choose a material that is better suited to each of the decoupling functions.

The shape of the first and/or second pads can differ from the shapes described above solely by way of example. The shape of the first and/or second pads can in particular be chosen so as to ensure satisfactory mechanical strength of the pads, while allowing a degree of decoupling between the inner and outer rings 22, 24.

Also, in the examples illustrated, the inner ring forms fingers received in recesses formed in the outer ring. However, the reverse configuration is conceivable, with the outer ring having fingers oriented radially toward the inner ring and received in recesses formed in this inner ring.

The radial stops can also take forms other than those described here. The radial stops can in particular be formed by studs attached to the inner ring 22 and/or to the outer ring 24. Advantageously, however, each radial stop is fixed to one of the two inner and outer rings 22, 24 and extends between these two inner and outer rings 22, 24, with radial clearance.

Orthoradial stops can be provided, in order to limit the relative rotation of the inner ring 22 and the outer ring 24, about the axis A of rotation of the fan impeller 12. These orthoradial stops can in particular be provided in the recesses 36 and interact with the finger 34 received therein. The orthoradial stops can also be formed by studs attached to the ring forming the recesses 36.

Finally, in the example illustrated, three pairs of radial stops are evenly distributed on the inner ring and on the outer ring, about the common axis of the two inner and outer rings. Of course, this number of radial stops is nonlimiting. The motor mount can in particular comprise two radial stops that are opposite each other in relation to the center of the inner and outer rings 22, 24, or three or more radial stops, preferably evenly angularly distributed about the common axis of the inner and outer rings.

The invention claimed is:

1. A motor mount for a motor-fan unit of fan for a vehicle heating, ventilation and/or air-conditioning device, comprising:
    two coaxial rings namely an inner ring able to receive one or more elements of the motor and an outer ring able to be fixed to a housing that forms a structural element;
    a first decoupling means for limiting the vibration of the two coaxial rings in a plane normal to a common axis of the two coaxial rings; and a second decoupling means for limiting the relative movement of the two coaxial rings in the direction of the common axis of the two coaxial rings,
    wherein the outer ring provides one or more orthoradial stops that limit a relative rotation of the inner ring and the outer ring, and one or more fingers that extend radially from the inner ring and is respectively housed in a recess formed in the outer ring,
    wherein the first decoupling means comprises a plurality of first resilient pads positioned radially between the inner ring and the outer ring, and a resilient ring between the two coaxial rings that is overmolded on the two coaxial rings,
    wherein the second decoupling means comprises a plurality of second resilient pads positioned axially between the two coaxial rings, and the second resilient pads are overmolded on the one or more fingers of the inner ring, and wherein each second resilient pad has an H-shaped cross-section such that each arm of the H is in contact with a respective ring.

2. The motor mount as claimed in claim 1, wherein the resilient ring is made from an elastomeric material.

3. The motor mount as claimed in claim 2, wherein the elastomeric material has a Shore hardness greater than or equal to 25 and less than or equal to 50.

4. The motor mount as claimed in claim 2, in which the first resilient pads being integrally formed with the resilient ring.

5. The motor mount as claimed in claim 1, in which each second resilient pad is in the shape of two half-cylinders joined by their cylindrical surfaces, a planar surface of each half-cylinder being in contact with a respective ring, the two half-cylinders extending along parallel axes, the parallel axes being perpendicular to the common axis of the two coaxial rings.

6. The motor mount as claimed in claim 1, wherein each second resilient pad extending between the finger of the inner ring and a wall of the associated recess in the outer ring, normal to the common axis of the rings.

7. The motor mount as claimed in claim 6, in which the second resilient pad extends between each of the fingers of the inner ring and the walls of the associated recess in the outer ring, normal to the common axis of the rings.

8. The motor mount as claimed in claim 1, in which each second resilient pad is axially compressed, the compression ratio of each second resilient pad being greater than or equal to 5% and less than or equal to 15%.

9. The motor mount as claimed in claim 1, in which the first resilient pads are integrally formed with the resilient ring.

10. The motor mount as claimed in claim 1, wherein the second resilient pads are in contact with a planar surface of the fingers.

11. A fan for a vehicle heating, ventilation and/or air-conditioning device, comprising:

a brushless electric motor;

a fan impeller, rotated by the brushless electric motor; and motor mount as claimed in claim 1, a stator of the motor being fixed to the inner ring of the motor mount.

* * * * *